United States Patent
Wang et al.

(10) Patent No.: US 8,473,133 B2
(45) Date of Patent: Jun. 25, 2013

(54) TRANSIENT OPERATION ENERGY MANAGEMENT STRATEGY FOR A HYBRID ELECTRIC VEHICLE POWERTRAIN

(75) Inventors: Qing Wang, Canton, MI (US); Fazal Urrahman Syed, Canton, MI (US); Ming Lang Kuang, Canton, MI (US); Shailesh Shrikant Kozarekar, Novi, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 13/089,398

(22) Filed: Apr. 19, 2011

(65) Prior Publication Data

US 2012/0271492 A1    Oct. 25, 2012

(51) Int. Cl.
 *B60L 9/00* (2006.01)
 *B60L 11/00* (2006.01)
 *G05D 1/00* (2006.01)
 *G05D 3/00* (2006.01)
 *G06F 7/00* (2006.01)
 *G06F 17/00* (2006.01)

(52) U.S. Cl.
 USPC ............ 701/22; 180/65.265; 477/3; 903/930

(58) Field of Classification Search
 USPC ............ 701/22; 180/65.265; 477/3; 903/930
 See application file for complete search history.

(56) References Cited

U.S. PATENT DOCUMENTS

| | | | |
|---|---|---|---|
| 6,845,305 B1 * | 1/2005 | Raftari et al. | 701/22 |
| 6,907,325 B1 * | 6/2005 | Syed et al. | 701/22 |
| 7,117,964 B1 * | 10/2006 | Kuang et al. | 180/65.22 |
| 7,273,439 B2 * | 9/2007 | Kuang et al. | 477/3 |
| 7,398,147 B2 | 7/2008 | Kozarekar et al. | |
| 7,434,641 B2 * | 10/2008 | Takami et al. | 180/65.25 |
| 7,473,205 B2 * | 1/2009 | Shimizu et al. | 477/3 |
| 7,788,023 B2 * | 8/2010 | Ando et al. | 701/112 |
| 7,801,662 B2 * | 9/2010 | Kozarekar et al. | 701/101 |
| 7,836,987 B2 * | 11/2010 | Aoki | 180/65.265 |
| 7,878,175 B2 * | 2/2011 | Livshiz et al. | 123/406.23 |
| 2007/0145948 A1 * | 6/2007 | Lim et al. | 320/132 |
| 2008/0243325 A1 * | 10/2008 | Kozarekar et al. | 701/22 |
| 2008/0293538 A1 * | 11/2008 | Saito et al. | 477/3 |
| 2010/0075798 A1 * | 3/2010 | Suzuki et al. | 477/5 |
| 2010/0275877 A1 * | 11/2010 | Ramappan et al. | 123/295 |

* cited by examiner

*Primary Examiner* — Khoi Tran
*Assistant Examiner* — Rachid Bendidi
(74) *Attorney, Agent, or Firm* — David B. Kelley; Brooks Kushman P.C.

(57) ABSTRACT

A method and system for providing a dynamic torque band for hybrid electric vehicle (HEV) transient management includes determining a torque band indicative of an engine torque operation region representing efficient operation of the powertrain across a range of engine speeds. An engine torque command based on an actual speed of the engine is generated. The engine torque command is outputted to the engine if the engine torque command is within the torque band. The engine torque command is modified to be within the torque band if the engine torque command is out of the torque band and the modified engine torque command is outputted to the engine.

19 Claims, 7 Drawing Sheets (Background)

TRANSIENT OPERATION ENERGY MANAGEMENT STRATEGY FOR A HYBRID ELECTRIC VEHICLE POWERTRAIN

TECHNICAL FIELD

The present invention relates to managing the power from the two power sources of a hybrid electric vehicle (HEV) powertrain.

BACKGROUND

A series-parallel hybrid electric vehicle (HEV) powertrain has two power sources for delivering power to the vehicle traction wheels. The first power source includes an engine and a generator mechanically coupled by a planetary gear arrangement. The second power source is an electric drive system including a battery, a motor, and the generator.

When the powertrain is operating in a driving mode that includes the first power source, the planetary arrangement, together with the engine and the generator, cooperate to effect a power delivery characteristic that is analogous to the characteristic of a conventional continuously variable transmission. This is done by controlling generator speed, the generator being connected to the sun gear of the planetary arrangement and the engine being connected to a planetary carrier. The ring gear of the planetary arrangement is connected to the wheels through torque transfer gearing and a differential-and-axle-assembly.

Because of the fixed ratio of the planetary arrangement and the variable generator speed, which achieve a decoupling of engine speed and vehicle speed, the planetary arrangement acts as a power divider that divides engine output power and distributes power to the torque transfer gearing and to the generator through separate power flow paths. The portion of the power delivered from the engine to the generator can be transmitted to the motor and then to the differential-and-axle assembly through the torque transfer gearing. Generator torque functions as a torque reaction as engine power is delivered through the planetary arrangement.

When the powertrain is operating using the second power source, the motor draws power from the battery and provides driving torque to the wheels independently of the first power source.

The two power sources can provide traction power either simultaneously or independently. However, the power sources must be integrated to work together seamlessly to meet a driver's demand for power within system power constraints while optimizing total powertrain system efficiency and performance. This requires a coordination of control of the power sources.

To this end, the powertrain includes a vehicle system controller or the like configured to control the power sources. The controller determines an engine torque and engine speed operating region to meet a driver demand for power while maintaining optimal fuel economy and optimum emissions quality under various vehicle operating conditions. The powertrain can achieve better fuel economy by the controller operating the engine in its most efficient torque and speed operating region whenever possible.

A problem is that real-world driving consists of many fast demand changes, which result in the powertrain experiencing rapid transients that adversely affect the fuel economy. In general, powertrain transient responses have more influence on 'engine efficiency' than 'electrical efficiency' in the powertrain. When the powertrain moves its operation point (torque and speed) from one point to another, there is a transient process that the engine can easily run off system-optimum settings thereby costing extra energy compared to steady-state optimum. On the other hand, it is difficult to confine the engine operation strictly along a steady-state optimal path. It not only requires more control efforts but it also causes more electrical re-circulation losses depending on driving conditions. Furthermore, it is infeasible to calculate the 'true' global-optimal engine torque command unless all future driving conditions are known a priori, and that underlying computation is extremely intensive. The challenge is due to the complex tradeoff between instant energy efficiency and long-term system losses.

U.S. Pat. No. 7,398,147 describes an energy management strategy (EMS) based on static optimization. Such an energy management strategy utilizes offline computation to generate optimal EMS tables that are populated with steady-state values corresponding to minimum power losses. For example, the tables may contain steady-state 'battery power' and 'engine speed' targets as two degrees of control freedom. A drawback is that an offline static optimization process cannot incorporate transient dynamics into calculation.

SUMMARY

In an embodiment, a method for a hybrid electric vehicle (HEV) powertrain having an engine and a battery is provided. The method includes determining a torque band indicative of an engine torque operation region representing efficient operation of the powertrain across a range of engine speeds. An engine torque command based on an actual speed of the engine is generated. The engine torque command is outputted to the engine if the engine torque command is within the torque band. The engine torque command is modified to be within the torque band if the engine torque command is out of the torque band and the modified engine torque command is outputted to the engine.

In an embodiment, a method for a HEV powertrain having an engine and a battery is provided. The method includes determining a desired engine torque target and generating an engine torque command. The engine torque command is outputted to the engine if the engine torque command is within a predetermined threshold of the engine torque target. The engine torque command is modified to either be the engine torque target or be within the threshold of the engine torque target if the engine torque command is out of the threshold of the engine torque target, and the modified engine torque command is outputted to the engine.

In an embodiment, a system for managing transient operation of a HEV powertrain having an engine and a battery is provided. The system includes a torque band determination unit configured to determine a torque band indicative of an engine torque operation region representing efficient operation of the powertrain across a range of engine speeds. The system further includes an engine torque command generator configured to generate an engine torque command based on an actual speed of the engine. The system further includes an arbitrator configured to output the engine torque command to the engine if the engine torque command is within the torque band. The arbitrator is further configured to modify the engine torque command to be within the torque band if the engine torque command is out of the torque band and output the modified engine torque command to the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
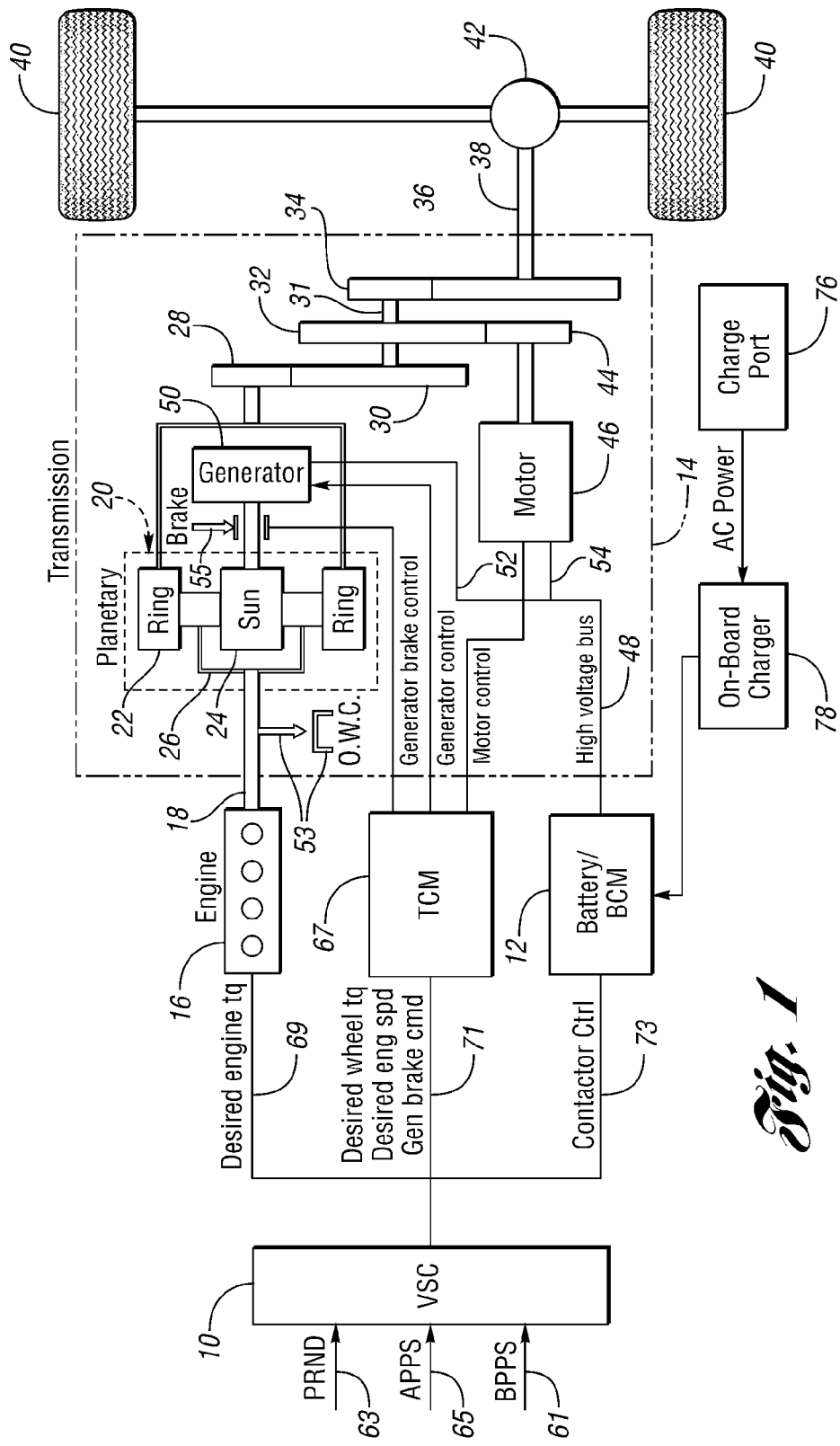
FIG. 1 illustrates a schematic representation of a series-parallel hybrid electric vehicle (HEV) powertrain capable of embodying the present invention.

Referring now to FIG. 1, a schematic representation of a series-parallel hybrid electric vehicle (HEV) powertrain capable of embodying the present invention is shown. The powertrain includes two power sources that are connected to the driveline: 1) an engine 16 and a generator 50 connected together via a planetary gear arrangement 20 and 2) an electric drive system including a battery 12, an electric motor 46, and generator 50. Battery 12 is an energy storage system for motor 46 and generator 50.

A vehicle system controller (VSC) 10 is configured to send control signals to and receive sensory feedback information from one or more of battery 12, engine 16, motor 46, and generator 50 in order for power to be provided to vehicle traction wheels 40 for propelling the vehicle.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42.

Gears 30, 32, and 34 are mounted on a counter shaft 31 with gear 32 engaging a motor-driven gear 44. Motor 46 drives gear 44. Gear 44 acts as a torque input for counter shaft 31.

Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65.

A brake pedal position sensor (BPPS) distributes a wheel brake signal to controller 10, as shown at 61. A brake system control module (not shown) may issue to controller 10 a regenerative braking command based on information from the BPPS. TCM 67 issues a generator brake control signal to generator brake 55. TCM 67 also distributes a generator control signal to generator 50.

Briefly, it is noted that the powertrain may be employed in a plug-in hybrid electric vehicle (PHEV). In this case, battery 12 is rechargeable from a power source residing external the vehicle (e.g., an external electric grid). Battery 12 periodically receives AC electrical energy from the grid via a charge port 76 connected to the grid. An on-board charger 78 receives the AC electrical energy from charge port 76. Charger 78 is an AC/DC converter which converts the received AC electrical energy into DC electrical energy suitable for charging battery 12. In turn, charger 78 supplies the DC electrical energy to battery 12 in order to charge battery 12 during the recharging operation.

Figure 2:
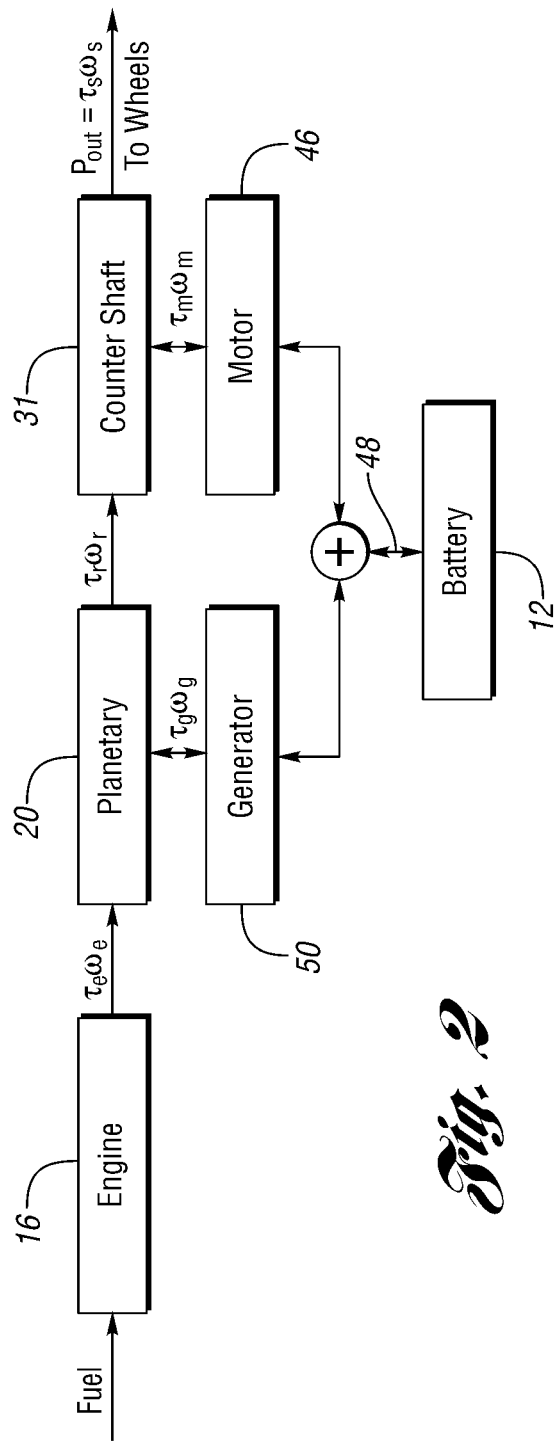
FIG. 2 illustrates a block diagram of power flow in the powertrain shown in FIG. 1.

Referring now to FIG. 2, a block diagram of power flow paths between the various components of the powertrain of FIG. 1 is shown. Fuel is delivered to engine 16 under the control of the driver in known fashion using an engine throttle. Engine power delivered from engine 16 to planetary arrangement 20 is the product $\tau_e \omega_e$, where $\tau_e$ is engine torque and $\omega_e$ is engine speed. Power delivered from planetary arrangement 20 to counter shaft 31 is the product $\tau_r \omega_r$, where $\tau_r$ is the ring gear torque and $\omega_r$ is the ring gear speed. Power out ($P_{out}$) of transmission 14 via output shaft 38 is the product $\tau_s \omega_s$, where $\tau_s$ and $\omega_s$ are the torque and speed of output shaft 38, respectively.

Generator 50 can act as a motor and deliver power to planetary arrangement 20. Alternatively, generator 50 can be driven by planetary arrangement 20. Similarly, power distribution between motor 46 and counter shaft 31 can be distributed in either direction. Driving power from battery 12 or charging power to battery 12 is represented by the bi-directional arrow 48.

The engine output power ($\tau_e \omega_e$) can be split into two paths. This can be done by controlling the speed of generator 50. The mechanical power flow path ($\tau_r \omega_r$) of the engine output power is from planetary arrangement 20 to counter shaft 31. The electrical power flow path ($\tau_g \omega_g$ to $\tau_m \omega_m$) of the engine output power is from planetary arrangement 20, to generator 50, to motor 46, and to counter shaft 31, where $\tau_g$ is the generator torque, $\omega_g$ is the generator speed, $\tau_m$ is the motor torque, and $\omega_m$ is the motor speed. As described, the engine power is split, whereby the engine speed is disassociated from the vehicle speed. In this so-called positive split mode of operation, engine 16 delivers power to planetary arrangement 20, which delivers power ($\tau_r\omega_r$) to counter shaft 31, which in turn drive wheels 40. A portion of the planetary gearing power ($\tau_g\omega_g$) is distributed to generator 50, which delivers charging power to battery 12. The speed of generator 50 is greater than zero or positive, and the generator torque is less than zero. Battery 12 drives motor 46, which distributes power ($\tau_m\omega_m$) to counter shaft 31.

If generator 50, due to the mechanical properties of planetary arrangement 20, acts as a power input to planetary arrangement 20 to drive the vehicle, the operating mode is referred to as the so-called negative split mode of operation. In this mode, both the generator speed and generator torque are negative. In particular, generator 50 delivers power to planetary arrangement 20 as motor 46 acts as a generator and battery 12 is charging. Under some conditions motor 46 may distribute power to counter shaft 31 if the resulting torque at wheels 40 from counter shaft 31 does not satisfy the driver demand. Then motor 46 makes up the difference.

If generator brake 55 is activated, a parallel operating mode is established. In the parallel operating configuration, engine 16 is on and generator 50 is braked. Battery 12 powers motor 46, which powers counter shaft 31 simultaneously with delivery of power from engine 16 to planetary arrangement 20 to counter shaft 31.

In the powertrain of FIG. 1, engine 16 requires either the generator torque resulting from engine speed control or the generator brake torque to transmit its output power through both the electrical and mechanical paths (split modes) or through the all-mechanical path (parallel mode) to the drivetrain for forward motion.

During operation with the second power source (previously described as including battery 12, motor 46, and generator 50), motor 46 draws power from battery 12 and provides propulsion independently from engine 16 to the vehicle for forward and reverse motions. In addition, generator 50 can draw power from battery 12 and drive against one-way clutch 53 coupling on the engine output shaft to propel the vehicle forward.

As described, the powertrain has two power sources for delivering driving power to wheels 40. The first power source generally includes engine 16 and the second power source includes battery 12, motor 46, and generator 50.

As further described, the operation of the powertrain integrates the two power sources to work together seamlessly to meet the driver's demand without exceeding the system limits (such as battery limits) while optimizing the total powertrain system efficiency and performance. Coordination control between the power sources is needed. As shown in FIG. 1, the powertrain includes controller 10 which performs the coordination control.

Under normal powertrain conditions, controller 10 interprets the driver demands (e.g., acceleration and deceleration demand), and then determines the wheel torque command based on the driver demand and powertrain limits. In addition, controller 10 determines when and how much torque each power source needs to provide in order to meet the driver's torque demand and determines the operating point (torque and speed) of the engine.

Figure 3:
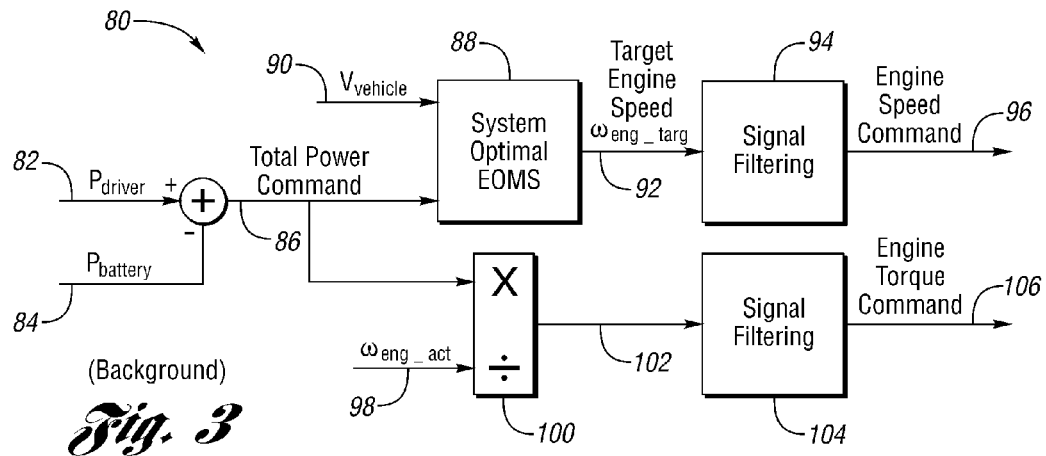
FIG. 3 illustrates a block diagram of a system for implementing an energy management strategy based on static optimization for a HEV powertrain.

Referring now to FIG. 3, a block diagram of a system 80 for implementing an energy management strategy (EMS) based on static optimization for a HEV powertrain such as the powertrain shown in FIG. 1 is shown. System 80 is implemented by, for instance, controller 10. In general, this EMS utilizes offline computation to generate tables that are populated with steady-state target values corresponding to minimum power losses. For example, the tables contain steady-state 'battery power' and 'engine speed' targets as two degrees of control freedom.

In system 80, a driver power demand (P driver) 82 and a battery charge and discharge power request ($P_{battery}$) 84 are combined to produce a total power command ($P_{total\_cmd}$) 86. A system optimal engine operating management strategy (EOMS) controller 88 receives an actual vehicle speed ($V_{vehicle}$) 90 and total power command 86. EOMS controller 88 develops a target engine speed ($\omega eng\_{targ}$) 92 based on vehicle speed 90 and total power command 86. EOMS controller 88 develops target engine speed 86 such that the total powertrain loss is a minimum. A first signal filter 94 filters target engine speed 92 to produce an engine speed command 96.

A divisor (math map) 100 computes an engine torque command ($\tau_{eng\_cmd}$) 102 from total power command 86 and an actual engine speed ($\omega_{eng\_act}$) 98 (i.e., $\tau_{eng\_cmd} = P_{total\_cmd}/\omega_{eng\_act}$). A second signal filter 104 filters engine torque command 102 to produce a filtered engine torque command 106.

The filtering by second signal filter 104 is done to avoid an instantaneous, uncontrolled spike or pulse in battery power command when a sudden change in total power command is made. Controller 10, at the instant an increased total power command is made, provides an increased engine torque during a transition from one total power command to another. This gives a quick response to a driver's demand for a new power level (new torque at the wheels). Second signal filter 104 filters the engine torque command, however, to introduce a filter time lag in the engine torque command change, which avoids a battery power command spike during the total power command transition. As the engine speed then increases, the engine torque command decreases over time to a steady-state value.

EOMS controller 88 maximizes the total system efficiency for a given vehicle speed and total power command by adjusting the engine speed command, followed by an adjustment of the engine torque command. EOMS controller 88 maximizes total system efficiency by minimizing total losses in the system.

Figure 4:
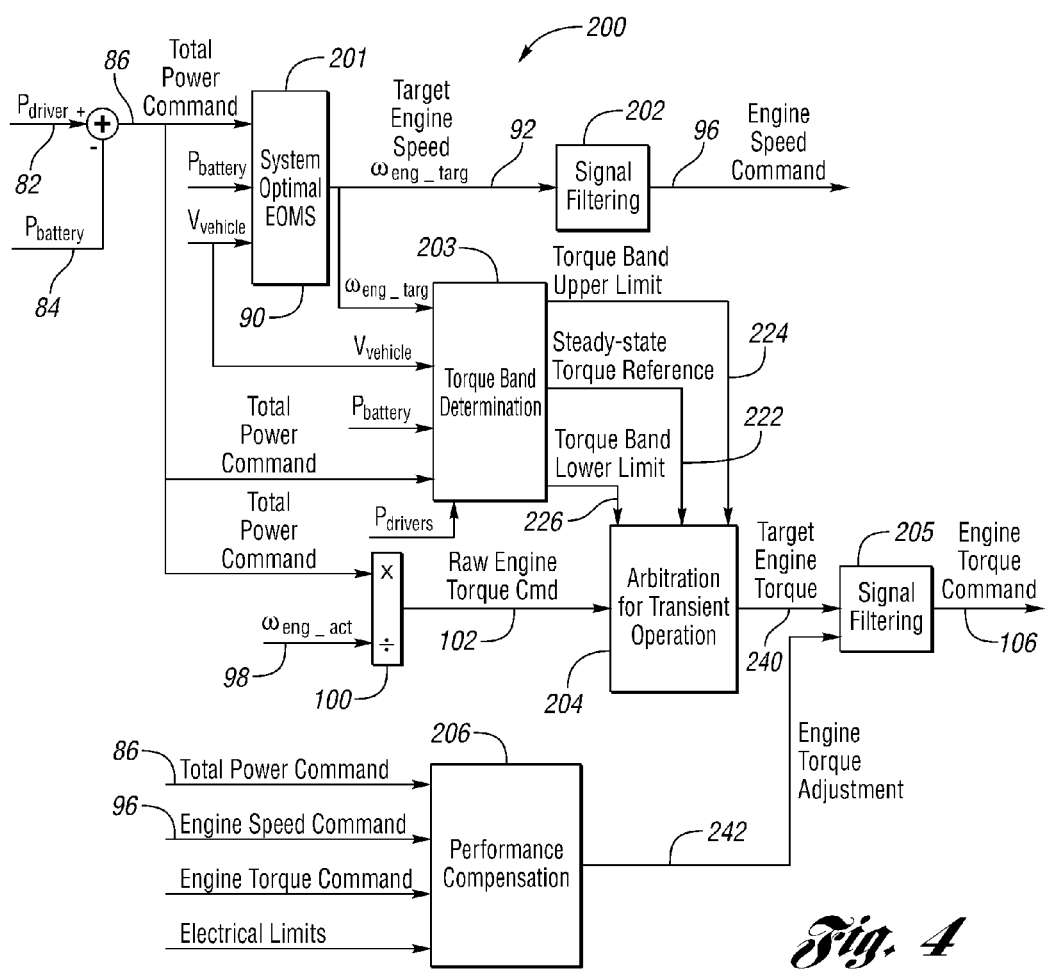
FIG. 4 illustrates a block diagram of a system for implementing a transient operation energy management strategy in accordance with an embodiment of the present invention for a HEV powertrain.

Referring now to FIG. 4, a block diagram of a system 200 for implementing a transient operation energy management strategy in accordance with an embodiment of the present invention for a HEV powertrain such as the powertrain shown in FIG. 1 is shown. Again, system 200 is implemented by, for example, controller 10.

As shown in FIG. 4, system 200 includes a system optimal EOMS controller 201 for producing a target engine speed 92 based on a total power command 86 and an actual vehicle speed 90. System 200 further includes a first signal filter 202 for filtering target engine speed 92 to produce an engine speed command 96. In these manners, system 200 is similar to system 80 shown in FIG. 3.

System 200 further includes a torque band determination (TBD) unit 203, an arbitrator for transient operation 204, a performance compensator 206, and a second signal filter 205. As explained in greater detail below, system 200 generally differs from system 80 in that system 200 includes: (i) TBD unit 203 and arbitrator 204 and (ii) compensator 206. As further explained below, such additional components 203, 204, 206 effectively convert system 200 into an add-on EMS feature to system 80 for the purpose of managing HEV engine torque during transients (i.e., the transient operation EMS). To this end, system 200 captures additional fuel economy benefit by managing powertrain transient operation.

TBD unit 203 and arbitrator 204 carry out a mitigation function pursuant to the transient operation EMS. The mitigation function utilizes an adaptive band which represents the 'system sweet spot' for the engine operation so as to achieve total system optimum. A goal of the transient operation EMS is not to change the steady-state targets, but rather to regulate engine transients only if necessary. By doing so, the transient operation EMS effectively minimizes unnecessary transient deviations of the engine torque from the steady-state optimum.

In the meanwhile, compensator 206 checks the battery power limits and adjusts the engine torque command to guarantee performance. In case the driver command exceeds the sum of the engine power command and the maximum electrical power, the engine torque will be adjusted accordingly.

Steps of the transient operation EMS implemented by system 200 will now be described in greater detail below.

Figure 5:
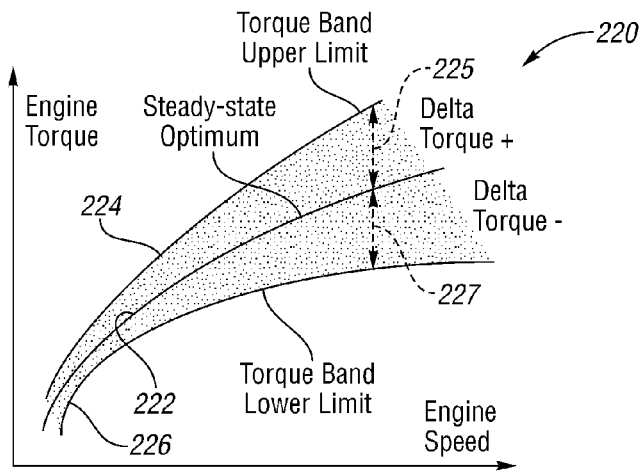
FIG. 5 illustrates a plot of a torque band determined by the torque band determination unit of the system shown in FIG. 4.

Referring now to FIG. 5, with continual reference to FIG. 4, a plot 220 of a torque band determined by TBD unit 203 is shown. In order to determine the torque band, TBD unit 203 receives target input speed 92, vehicle speed 90, battery power request 84, total power command 86, and driver power demand 82.

A purpose of plot 220 is to conceptually illustrate the torque band determined by TBD unit 203. The torque band serves as a real-time guideline to mitigate unnecessary transients by regulating the engine torque inside a high-efficient operation region.

The following three signals are plotted to define the torque band as graphically shown in FIG. 5: a steady-state torque reference signal 222; a torque band upper limit signal 224; and a torque band lower limit signal 226. Signals 222, 224, and 226 are plotted as a function of engine speed in plot 220 only for simplicity of illustration. The actual functions of signals 222, 224, and 226 contain more inputs in addition to 'engine speed'. The location and width of the torque band dynamically change as a function of driver demands and vehicle operation states.

Figure 6:
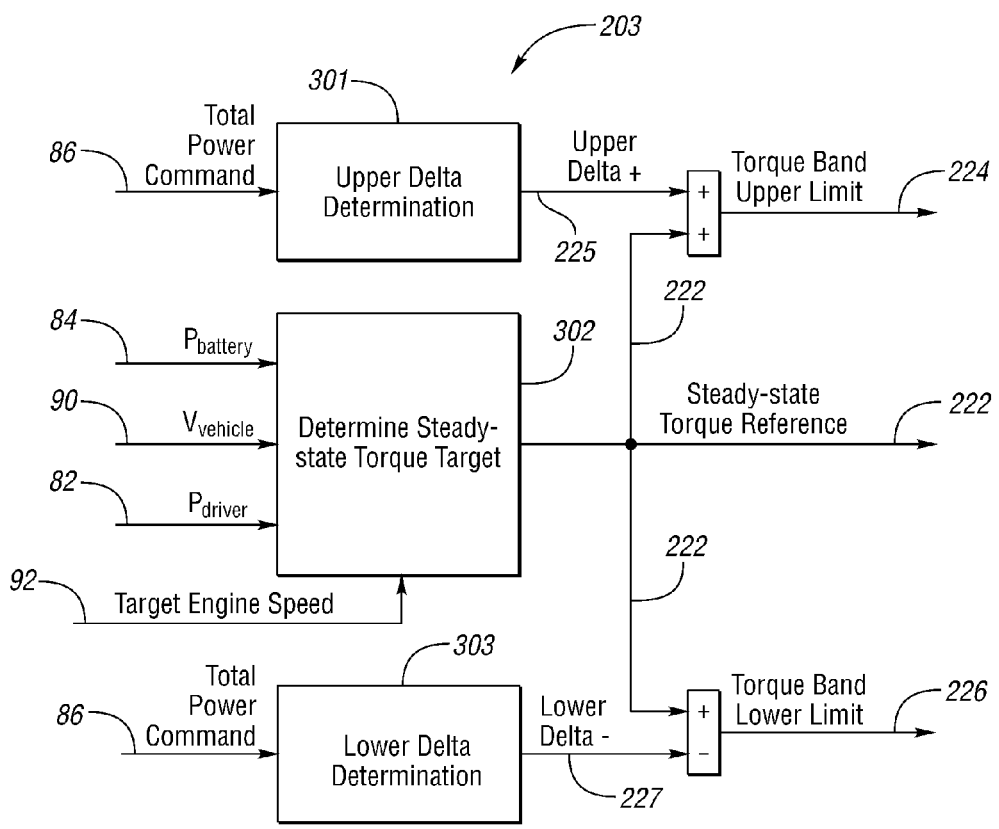
FIG. 6 illustrates a block diagram of the torque band determination unit in greater detail.

Referring now to FIG. 6, with continual reference to FIGS. 4 and 5, a block diagram of TBD unit 203 in greater detail is shown. TBD unit 203 includes: a steady-state torque target determination sub-unit 302 for determining steady-state reference signal 222 of the torque band; an upper delta determination sub-unit 301 for determining torque band upper limit signal 224 of the torque band; and a lower delta determination sub-unit 303 for determining torque band lower limit signal 226 of the torque band.

In determining steady-state reference signal 222, steady-state torque target determination sub-unit 302 receives battery power request 84, vehicle speed 90, driver power demand 82, and target engine speed 92. In order to describe how sub-unit 302 determines steady-state torque reference signal 222, an analysis of the energy flow and the efficiency for a given operating condition will be described with reference to FIG. 7.

Figure 7:
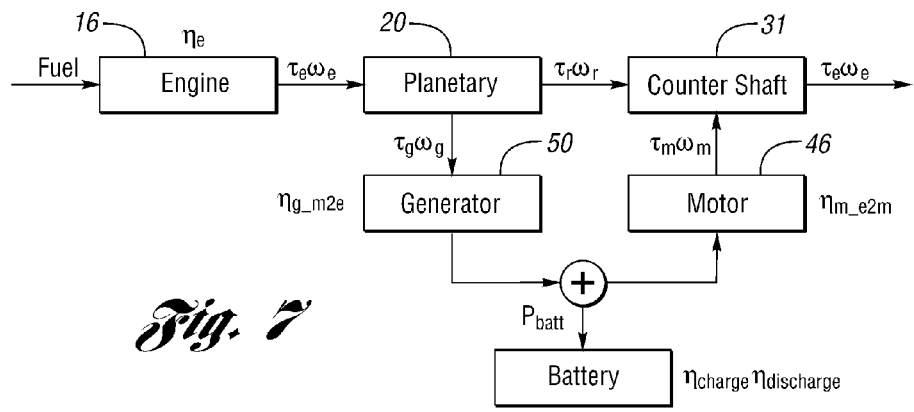
FIG. 7 illustrates a block diagram of power flow in the powertrain shown in FIG. 1 when the powertrain is operating pursuant to a drive and charge powersplit operating mode.

FIG. 7 illustrates a block diagram of power flow in the powertrain shown in FIG. 1 when the powertrain is operating pursuant to a 'drive and charge' powersplit operating mode. In this operating mode, engine 16 provides power to meet a driver demand with power flowing into battery 12. As indicated in FIG. 7, engine power output is delivered to the wheels to satisfy the driver demand through a mechanical power flow path and an electrical power flow path and engine power output is delivered to battery 12 through a portion of the electrical power flow path. The steady-state optimal torque target can be developed so that the total powertrain loss is a minimum as explained below.

The system power output is calculated as follows:

$$P_{out} = F*V = \tau_r \omega_r + \tau_m \omega_m + P_{batt} \eta_{charge} \eta_{discharge} \eta_{m\_e2m}$$

where:
$P_{out}$=powertrain output power;
$\tau_r$=ring gear torque (NM);
$\omega_r$=ring gear speed (radians/second);
$\tau_m$=motor torque (NM);
$\omega_m$=motor speed (radians/second);
$P_{batt}$=battery power;
$\eta_{charge}$=battery charging efficiency;
$\eta_{discharge}$=battery discharging efficiency; and
$\eta_{m\_e2m}$=the assumed electrical efficiency during the conversion of electrical power to mechanical power.

The total system efficiency then is $\eta_{total}$, as defined by the following equation:

$$\eta_{total} = (F*V)/(\tau_e \omega_e / \eta_e)$$
$$= \eta_e(T_{e2r}\omega_r + T_{e2g}\omega_g \eta_{g\_m2e} \eta_{m\_e2m})/(\omega_e)$$
$$= \eta_e(T_{e2r}\omega_r + T_{e2g}\omega_g - T_{e2g}\omega_g + T_{e2g}\omega_g \eta_{g\_m2e} \eta_{m\_e2m})/(\omega_e)$$
$$= \eta_e\{1 - (1 - \eta_{g\_m2e} \eta_{m\_e2m})T_{e2g}\omega_g/\omega_e -$$
$$(1 - \eta_{charge}\eta_{discharge})\eta_{m\_e2m} P_{batt}/(\tau_e \omega_e)\}$$

where:
$\tau_e$=engine output torque (NM);
$\tau_g$=generator torque (NM);
$\omega_g$=generator speed (radians/second);
$T_{e2r}$=torque ratio from engine to ring gear, $1/(1+\rho)$;
$T_{e2g}$=torque ratio from engine to generator, $\rho/(1+\rho)$;
$\rho$=the sun gear's teeth/the ring gear's teeth;
$\eta_{g\_m2e}$=the assumed generator efficiency during the conversion of mechanical power to electrical power; and
$\eta_e$=the engine efficiency.

It can be noted from "$\eta_{total}$" equations that the engine efficiency has the most influence on the total system efficiency.

The steady-state engine torque to minimize the total system loss can then be solved from the following equation:

$$\left[\operatorname*{Min}_{\omega_{eng}}(P_{total\_loss})\right] =$$
$$f_1(P_{total\_cmd}, V_{vech}, P_{eng\_loss}, P_{mot\_loss}, P_{batt\_loss}, P_{mech\_loss})$$

where:
$P_{eng\_loss} = f_2(\omega_{eng}, \tau_{eng})$
$P_{eng\_loss} = f_3(\omega_{gen}, \tau_{gen})$
$P_{mot\_loss} = f_4(\omega_{mot}, \tau_{mot})$
$P_{batt\_loss} = f_5(V_{batt}, I_{batt})$
$P_{mech\_loss} = f_6(P_{total\_cmd}, V_{veh})$
$\tau_{eng} = f_7(P_{total\_cmd}, \omega_{eng})$
$\omega_{gen} = f_8(\omega_{eng}, V_{veh})$
$\tau_{gen} = f_9(\tau_{eng})$
$\omega_{mot} = f_{10}(V_{veh})$
$\tau_{mot} = f_{11}(\tau_{eng}, P_{total\_cmd}, V_{veh})$
$I_{batt} = f_{12}(\omega_{gen}, \tau_{gen}, \omega_{mot}, \tau_{mot})$
$V_{batt} = f_{13}(I_{batt})$ The functions $f_2$ through $f_6$ are loss functions for each of the sub-systems and components of the powertrain. These loss functions are located in tables or maps that are pre-calibrated. Each map corresponds to one of the loss functions. The determinations of the loss functions are mapped and entered into an EMS table of steady-state torque target determination sub-unit 302. The stored values are based on experimental data.

The loss functions $f_7$ to $f_{11}$ are determined by the physical configuration of the powertrain, including the gearing ratio and the battery characteristics. Each mathematical formulation of a power loss indicates that for a given vehicle speed and a total power demand, there is a unique solution in the determination of target engine speed such that the total loss of the system is minimized.

After the power loss calculations for the several sub-systems or components are carried out, the values are compared, pursuant to the function $f_1$.

For any given engine speed command, there will be a computation of the power losses as indicated above. The minimum value for those computations of power loss at that engine speed command then is determined. The engine speed that corresponds to the minimum total power loss will not be the same as the engine speed that would correspond to maximum engine efficiency, but it is a speed that corresponds to maximum total system efficiency.

In an alternate control routine, it is possible to achieve minimization of total system losses by developing off-line, in a pre-calibration procedure, storeable lookup EMS tables which contain, for every total power command and for each corresponding vehicle speed, a predetermined engine speed that will achieve minimum total powertrain losses, which results in maximum powertrain efficiency.

In sum, the proceeding optimization described with respect to FIG. 7 is developed off-line in a pre-calibration procedure. Again, for each driver power command, for each battery power command, and for each corresponding vehicle speed, there is a predetermined engine torque that maximizes the total system efficiency as expressed by the above equations.

Figure 8:
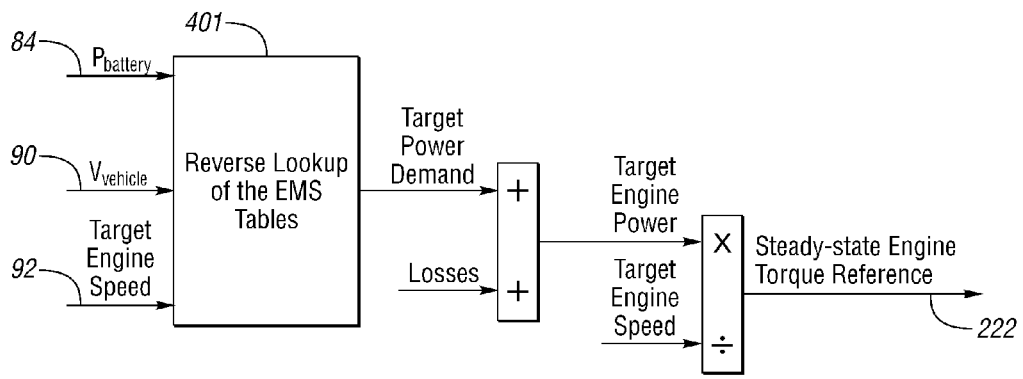
FIG. 8 illustrates a block diagram of an alternate implementation for carrying out the steady-state reference signal determination function of the torque band determination unit.

Referring now to FIG. 8, a block diagram of an alternate implementation for carrying out the steady-state reference signal determination function of steady-state torque target determination sub-unit 302 of TBD unit 203 is shown. This alternate implementation provides an alternate method for determining steady-state reference signal 222 for easier, but equivalent, implementation in a HEV powertrain such as the powertrain shown in FIG. 1.

As shown in FIG. 8, the alternate implementation employs a reverse lookup unit 401 ("reverse lookup of the EMS tables"). Reverse lookup unit 401 re-uses the lookup EMS tables generated using the alternate control routine described above. As described, these tables contain the predetermined steady-state engine speeds. Reverse lookup unit 401 re-uses these tables by doing a subtle 'reverse table lookup' to solve for the steady-state engine torque target. Such an equivalency is self-explanatory due to only one degree of freedom in the offline optimization, in which the 'engine speed' and 'engine torque' are interchangeable control variables. In other words, the reverse lookup is an equal process to replace 'engine speed' by 'engine torque' as the choice of the degree of freedom.

Although the tables used in the reverse lookup by reverse lookup unit 401 can be converted from tables generated by the EOMS controller, the tables used by reverse lookup unit 401 are designed and stored as separately calibrated to retain freedom of in-vehicle calibration to regulate the transient operation and balance other attributes as needed.

Figure 9A:
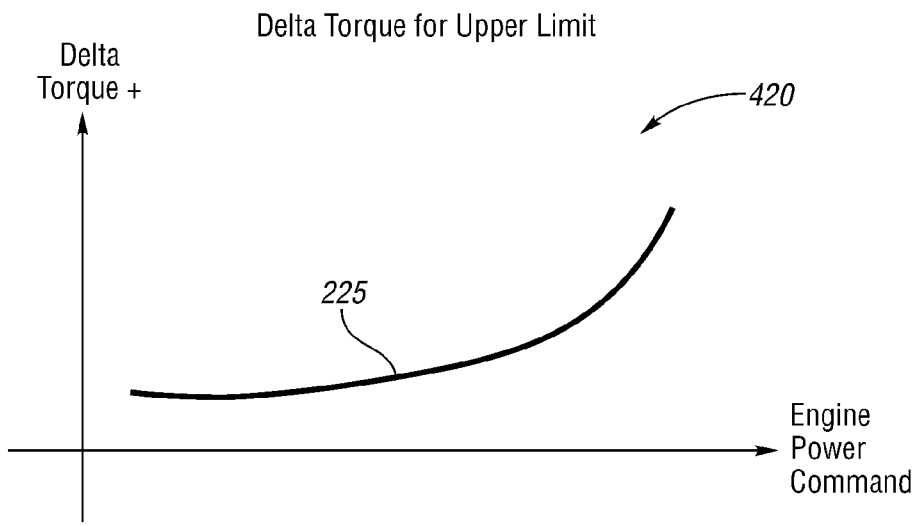
FIG. 9A illustrates a plot of the upper delta torque between the steady-state reference signal and the torque band upper limit signal as a function of the engine power command.
Figure 9B:
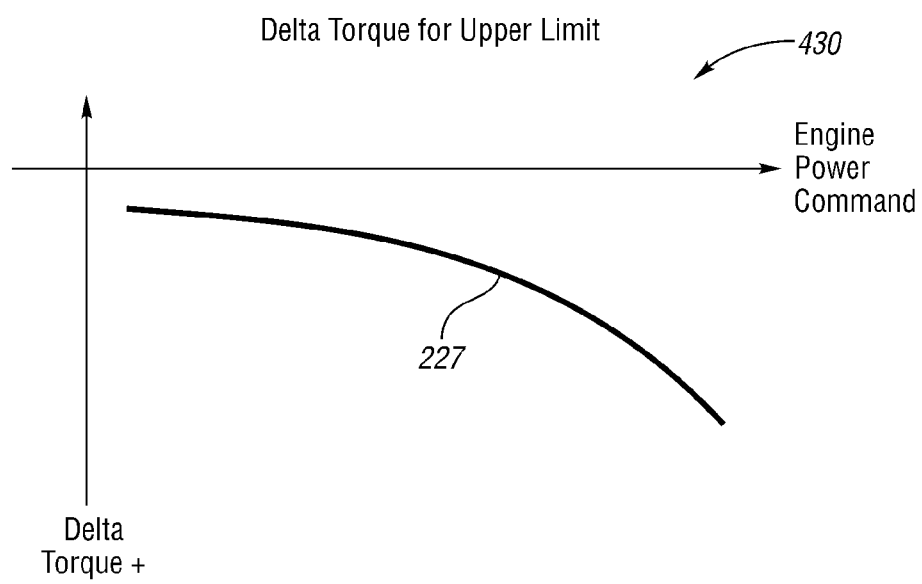
FIG. 9B illustrates a plot of the lower delta torque between the steady-state reference signal and the torque band lower limit signal as a function of the engine power command.

Referring now to FIGS. 9A and 9B, with reference to FIGS. 5 and 6, the torque band upper and lower limits respectively carried out by upper delta determination sub-unit 301 and lower delta determination sub-unit 303 will be described. FIG. 9A illustrates a plot 420 of the upper delta torque 225 between steady-state reference signal 222 and torque band upper limit signal 224 as a function of the engine power command. FIG. 9B illustrates a plot 430 of the lower delta torque 227 between torque band lower limit signal 226 and steady-state reference signal 222 as a function of the engine power command.

Plots 420 and 430 respectively represent calibratable tables. Upper and lower delta determination sub-units 301 and 303 respectively determine upper and lower torque limits 225 and 227 through the two calibratable tables. The design rationale is to set wider the transient operation range at higher the engine power load. This can be explained by the high-efficient island on the engine efficiency map that corresponds to higher engine power. Additional candidate inputs to each table include engine speed, vehicle speed, and battery power.

Figure 10:
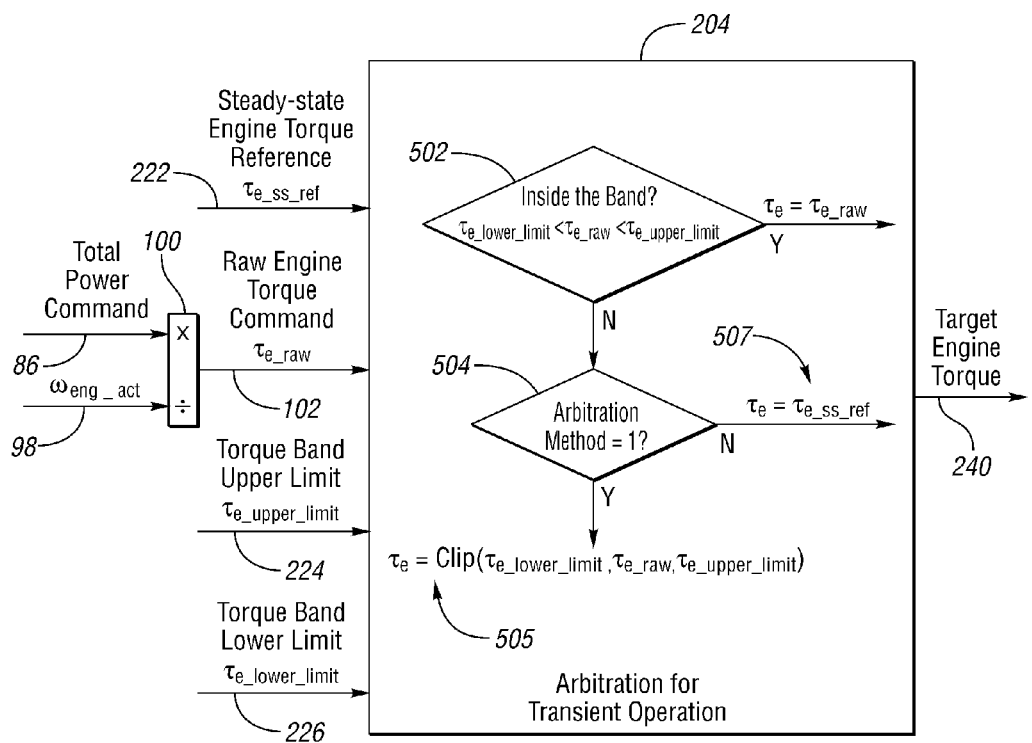
FIG. 10 illustrates a block diagram of the transient operation arbitrator of the system shown in FIG. 4 in greater detail.

Referring now to FIG. 10, with continual reference to FIG. 4, a block diagram of arbitrator 204 of system 200 in greater detail is shown. In general, arbitrator 204 arbitrates a final target engine torque command 240 based on raw engine torque command 102 and the determined (dynamic) torque band, which is represented by steady-state engine torque reference signal 222 and torque band upper and lower limit signals 224 and 226.

The design rationale of the transient operation EMS is to maintain the engine operation inside a dynamic operation band (i.e., the determined torque band) that represents the system-optimal sweet spot. If raw engine torque command 102 resides inside the high-efficient band as determined in decision block 502, then it is desirable to allow certain fast engine transient so as to speed up the powertrain's movement towards peak efficient points. In this case, arbitrator 204 outputs raw engine torque command 102 as final target engine torque command 240 (i.e., final torque command 240 ($\tau_e$) =raw engine torque command ($\tau_{e\_raw}$)). As such, the whole mitigation function remains inactive.

On the other hand, if raw engine torque command 102 falls out of the high-efficient band due to rapid transient as determined in decision block 502, arbitrator 204, according to the transient operation EMS, modifies the engine torque command such that it does not deviate too far from the steady-state optimum. Arbitrator 204 is configured to use either of two modification algorithms in making such modification. The modification algorithms can be selected by a calibratable switch ('Arbitration Method'=0 or 1) as indicated in decision block 504.

The first modification algorithm (i.e., Arbitration Method=1) performs simple clipping of raw engine torque command 102 as indicated at 505 when raw engine torque command 102 is out of the band. In this case, arbitrator 204 outputs the clipped raw engine torque command as final target engine torque command 240. The second modification algorithm (i.e., Arbitration Method=0) resets raw engine torque command 102 to the value of steady-state engine torque reference 222 as indicated at 507 when raw engine torque command 102 is out of the band. In this case, arbitrator 204 outputs steady-state engine torque reference 222 as final target engine torque command 240. In both modification algorithms, electrical assist during the transient guarantees no compromise to performance. Simulation results of both modification algorithms have shown promising fuel economy benefits.

Figure 11:
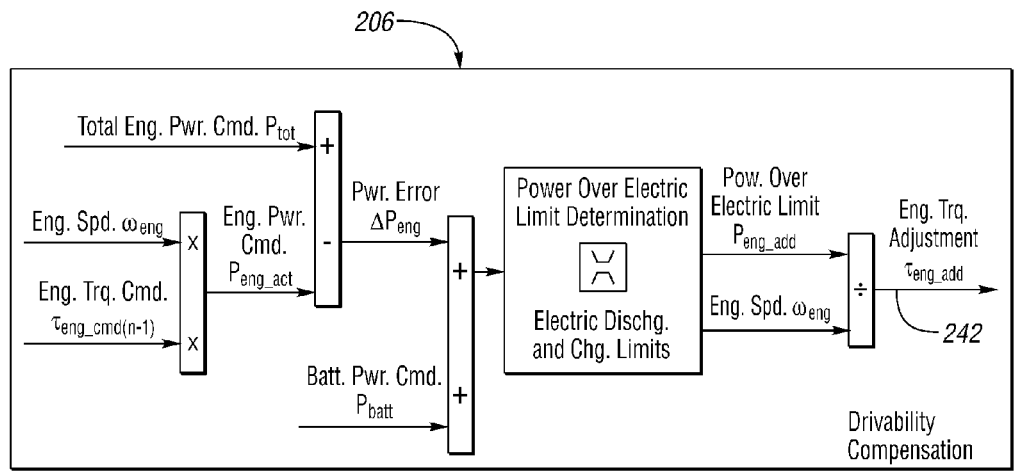
FIG. 11 illustrates a block diagram of the performance compensator of the system shown in FIG. 4 in greater detail.

Referring now to FIG. 11, with continual reference to FIG. 4, a block diagram of performance compensator 206 of system 200 in greater detail is shown. The vehicle fuel economy, during the transient, is much more sensitive to the engine operation variation than to the battery power variation. Therefore, an objective of the transient operation EMS is to keep the engine torque always inside the system-optimal band (i.e., the determined torque band). The battery power is forced to make up the entire transient deviation without violating the electrical limits. This takes advantage of the relatively high electrical efficiency by allowing more transient battery power variation, which has less impact to the overall fuel efficiency compared to the engine torque variation. Ideally, if the remaining electrical power is sufficient enough, it is desired to maintain the engine operation inside the band all the time during any transient shifting. However, in case the actual engine power command and the maximum electrical power, together, cannot meet the driver command, the engine torque can be adjusted accordingly for compensation by compensator 206 as shown in FIG. 11.

As shown in FIG. 11, compensator 206 calculates the total desired battery power over the electric limits and adds an adjustment term 242 on the engine torque so that the engine can provide the power shortage to maintain performance.

Turning back to FIG. 4, second filter system 205 filters the combined final target engine torque command 240 and adjustment term 242 to produce a filtered engine torque command 106.

As described, embodiments of the present invention provide a transient operation energy management strategy (EMS). Features of the transient operation EMS generally include: dynamically determining the system-optimum sweet spot; enabling the engine operation inside the system best-efficient region; mitigating and avoiding rapid torque change—minimizing unnecessary engine transients if battery can absorb driver's power "perturbation"; no performance compromise because of the automatic engine torque compensation; applicable to powersplit HEV, parallel HEV, series HEV, and other types of HEVs; and applicable to various driving conditions especially real-world driving.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a hybrid vehicle powertrain comprising:
    generating an engine torque command based on actual engine speed;
    outputting the torque command from a vehicle system controller to an engine when the torque command is within a torque band including an engine torque target for the actual engine speed;
    when the torque command is not within the torque band, outputting a modified engine torque command within the torque band from the controller to the engine.

2. The method of claim 1 wherein:
    the torque band includes an engine torque target for each engine speed in a range, wherein the engine torque target for each engine speed in the range is indicative of an engine torque which maximizes efficient operation of the powertrain at the engine speed.

3. The method of claim 2 wherein:
    the torque band includes an upper threshold and a lower threshold for each engine torque target, wherein the thresholds increase as engine speed increases.

4. The method of claim 3 wherein:
    the modified engine torque command is either the engine torque target for the actual engine speed, between the upper threshold and the engine torque target for the actual engine speed, or between the lower threshold and the engine torque target for the actual engine speed.

5. The method of claim 4 further comprising:
    increasing a battery power command as a function of the difference between the engine torque command and the modified engine torque command.

6. The method of claim 5 wherein:
    the battery power command may be increased to a maximum electric power command threshold; and
    the method further comprising adjusting the modified engine torque command to compensate for any difference between the engine torque command and the modified engine torque command remaining after a battery power command has been increased to the maximum electric power command threshold prior to the modified engine torque command being outputted to the engine.

7. The method of claim 5 wherein:
    generating the engine torque command based on the actual engine speed and a total power command, wherein the total power command is based on a driver power command and the battery power command.

8. The method of claim 1 further comprising:
    generating an engine speed command based on a total power command and an actual vehicle velocity; and
    outputting the engine speed command to an engine speed controller.

9. A method for a hybrid vehicle powertrain, the method comprising:
    generating an engine torque command for a torque target;
    outputting the engine torque command from a vehicle system controller to an engine if the engine torque command is within a torque band including the torque target; and
    outputting a modified engine torque command within the torque band from the controller to the engine if the engine torque command is out of the torque band.

10. The method of claim 9 wherein:
    the torque target corresponds to a candidate engine speed and is indicative of an engine torque for efficient operation of the powertrain at the candidate engine speed;
    wherein generating the engine torque command is based on an actual speed of the engine corresponding to the candidate engine speed.

11. The method of claim 9 further comprising:
    increasing a battery power command as a function of the difference between the engine torque command and the modified engine torque command.

12. The method of claim 11 wherein:
    the battery power command may be increased to a maximum electric power command threshold; and
    the method further comprising adjusting the modified engine torque command to compensate for any difference between the engine torque command and the modified engine torque command remaining after the battery power command has been increased to the maximum electric power command threshold prior to the modified engine torque command being outputted to the engine.

13. The method of claim 9 further comprising:
    generating an engine speed command based on a total power command and an actual vehicle velocity; and
    outputting the engine speed command to an engine speed controller.

14. A system for managing transient operation of a hybrid vehicle powertrain, the system comprising:
    an engine; a torque band determination unit configured to generate a torque band including an engine torque target for each engine speed across a range of engine speeds, wherein the engine torque target for each engine speed in the range is indicative of an engine torque representing efficient operation of the powertrain at the engine speed;

an engine torque command generator configured to generate an engine torque command based on an actual speed of the engine; and an arbitrator configured to output the engine torque command to the engine if the engine torque command is within a portion of the torque band which includes the engine torque target for the actual engine speed and to output a modified engine torque command within the portion of the torque band to the engine if the engine torque command is out of the portion of the torque band.

15. The system of claim 14 wherein:
the torque band includes an upper threshold and a lower threshold for each engine torque target, wherein the thresholds increase as engine speed increases.

16. The system of claim 15 wherein:
the arbitrator is further configured to modify the engine torque command to be within the torque band such that the modified engine torque command for the actual engine speed is either the engine torque target for the actual engine speed, between the upper threshold and the engine torque target for the actual engine speed, or between the lower threshold and the engine torque target for the actual engine speed.

17. The system of claim 16 further comprising:
a compensator configured to increase a battery power command as a function of the difference between the engine torque command and the modified engine torque command.

18. The system of claim 17 wherein:
the battery power command may be increased to a maximum electric power command threshold; and
the compensator further configured to adjust the modified engine torque command to compensate for any difference between the engine torque command and the modified engine torque command remaining after the battery power command has been increased to the maximum electric power command threshold prior to the modified engine torque command being outputted to the engine.

19. The system of claim 14 wherein the hybrid electric vehicle powertrain is a plug-in hybrid electric vehicle powertrain.

* * * * *